Patented Aug. 25, 1953

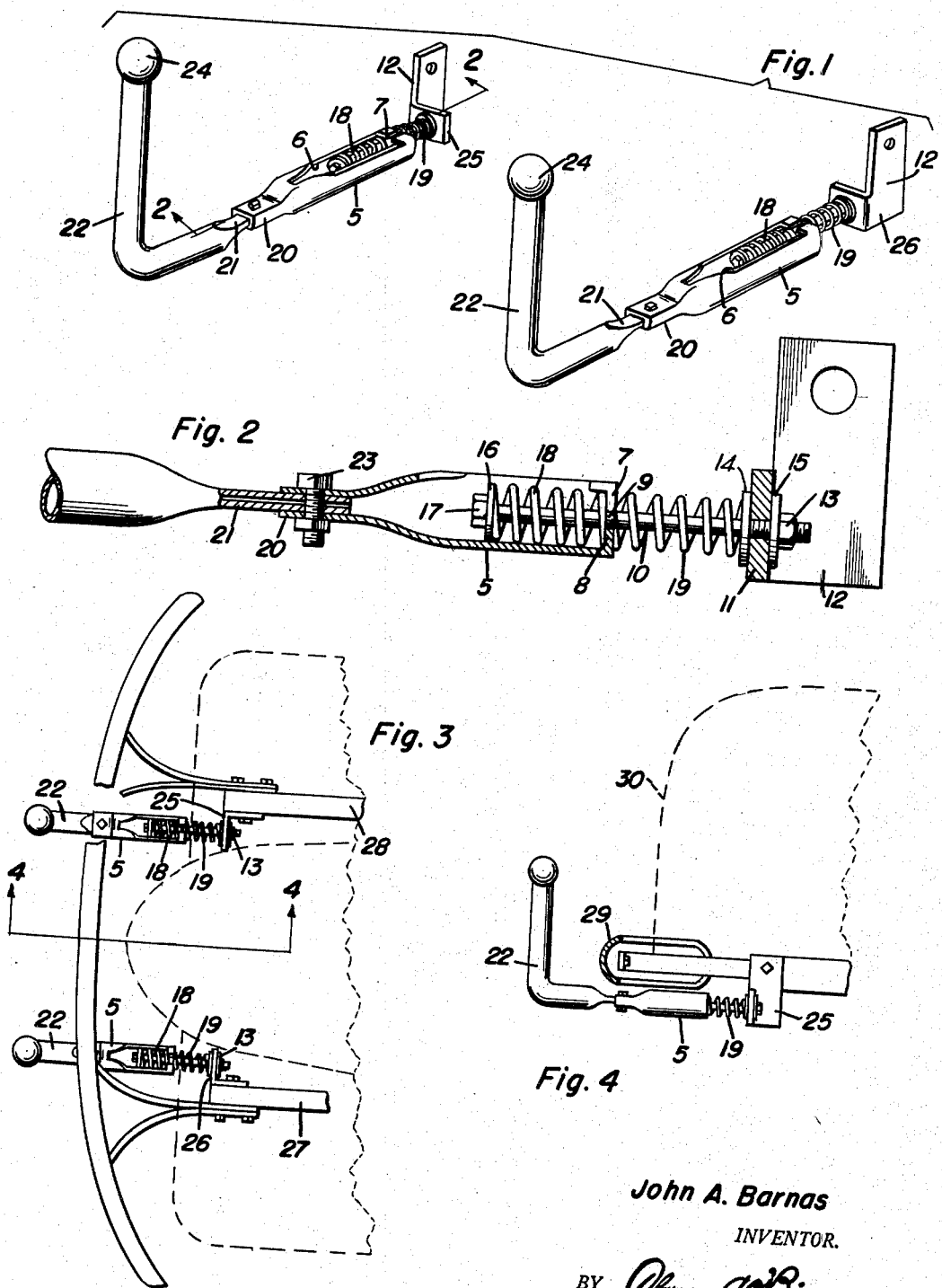
Aug. 25, 1953   J. A. BARNAS   2,650,126
GRILLE GUARD FOR AUTOMOBILES
Filed April 25, 1950
John A. Barnas
INVENTOR.

2,650,126

UNITED STATES PATENT OFFICE 2,650,126

GRILLE GUARD FOR AUTOMOBILES

John A. Barnas, Detroit, Mich.

Application April 25, 1950, Serial No. 158,007

3 Claims. (Cl. 293—64)

The present invention relates to new and useful improvements in grille guards for automobiles, and more particularly to the provision of a yieldable guard to relieve the automobile of destructive impacts directed thereto.

An important object of the invention is to provide an upstanding guard positioned in front of the grille of an automobile and a supporting arm for the guard, together with spring means opposing impact subjected to the guard to absorb the shock of the impact.

A further object of the invention is to provide a device of this character which may be easily and quickly attached in position to an automobile without necessitating any changes or alterations in the construction thereof and which, at the same time, is strong and durable, efficient and reliable in operation, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a group perspective view of a pair of the guards for attaching to the right and left side of an automobile;

Figure 2 is an enlarged fragmentary longitudinal sectional view, taken on the line 2—2 of Figure 1;

Figure 3 is a top plan view showing the guards attached to the automobile; and

Figure 4 is a sectional view taken on the line 4—4 of Figure 3.

Referring now to the drawing in detail, wherein, for the purpose of illustration, I have disclosed a preferred embodiment of the invention, the numeral 5 designates a tubular supporting arm having a longitudinally extending opening 6 in its top and formed at its rear end with upper and lower flanges 7 and 8 spaced from each other to provide an opening 9 therebetween to receive an attaching rod 10 on which the rear end of the arm 5 is slidable.

The rear end of rod 10 is attached to a flange 11 of an angle bracket 12 by means of a nut 13 threaded on the rear end of rod 10 and with washers 14 and 15 positioned at opposite sides of the flange 11. A washer 16 is also positioned on the front end of rod 10 and held thereon by a nut 17 and a front coil spring 18 is positioned on the front end of rod 10 between washer 16 and the flanges 7 and 8 and a rear coil spring 19 is positioned on the rear end of rod 10 between flanges 7 and 8 and the washer 14, the tension of the springs opposing each other and rear spring 19 holds the arm 5 forwardly in front of the attaching bracket 12.

The front end of tubular arm 5 is formed with flat sides to provide a substantially square shaped socket 20 in which the complementary shaped rear end 21 of an L-shaped tubular guard bar 22 is secured by means of a bolt and nut 23. The front end of guard bar 22 extends upwardly in front of arm 5 and is formed with an ornamental ball 24 at its upper end.

The attaching brackets 12 are formed to provide a right-hand bracket 25 and a left-hand bracket 26 which are secured to the sides of the front ends of the frame members 27 and 28 of an automobile or other motor vehicle to support arm 5 under the bumper 29 of the automobile and with the guard bar 22 positioned in front of the bumper and projecting upwardly in front of the grille 30 of the automobile.

The guard bars 22 positioned adjacent each side of the automobile will prevent direct impact to the bumper 29 or grille 30 by objects with which the automobile comes into contact and the spring 19 yields to the impact to slide supporting arm 5 rearwardly on rod 10, thus absorbing the shock and preventing damage to the front end of the automobile. Also, as the spring 19 is further compressed by the shock, the spring 18 is relieved from compression by the shock and placed in a state of tension, thus tending to return spring 19 to its initial position wherein the springs 18 and 19 are in equilibrium. Accordingly, it is apparent that as the compressive force is increased on spring 19, this force is correspondingly counteracted by the increased tension on spring 18 whereby injury to the front end of the automobile is most effectively prevented.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. A grille guard for automobiles, said guard comprising an arm, an upstanding impact member disposed at one end of said arm, flanges at the other end of said arm and having a passage therebetween, a rod provided with attaching means at one end adapted to fasten to an automobile, said rod being located in said passage, a first spring reacting on said attaching means and contacting one surface of each of said flanges, a second spring disposed on said rod and reacting on the opposite surface of each of said flanges, and means constituting a seat on said rod for said second spring whereby the two springs reacting on said flanges maintain said arm in position.

2. A grille guard for automobiles comprising a tubular arm, an upstanding impact member at one end of the arm, a rod slidably positioned in the other end of the arm, a flange secured to said arm, attaching means at the outer end of the rod, and spring means on the rod and reacting on said flange and said attaching means for holding the arm spaced from the attaching means, said arm being made of sections which are releasably connected together, one of said sections having said impact member and the other of said sections having said flange connected therewith.

3. A grille guard attachment for automobiles comprising a bracket adapted to be secured to an automobile frame, a rod having one end attached to said bracket, a tubular arm slidably embracing the free end of said rod, said arm including spaced flanges on one end thereof, said rod extending between said flanges, a first spring embracing said rod and having its ends abutting said bracket and one surface of said flanges, a second spring surrounding said rod and having its ends abutting the free end of said rod and the other surface of said flanges.

JOHN A. BARNAS.

References Cited in the file of this patent

UNITED STATES PATENTS

| Number | Name | Date |
| --- | --- | --- |
| 1,454,764 | O'Brien et al. | May 8, 1923 |
| 1,691,398 | Long | Nov. 13, 1928 |
| 1,798,278 | Scott et al. | Mar. 31, 1931 |